July 14, 1970  J. E. GLAUSER ET AL  3,520,034
SAFETY BELT BUCKLE
Filed Aug. 14, 1967  3 Sheets-Sheet 1
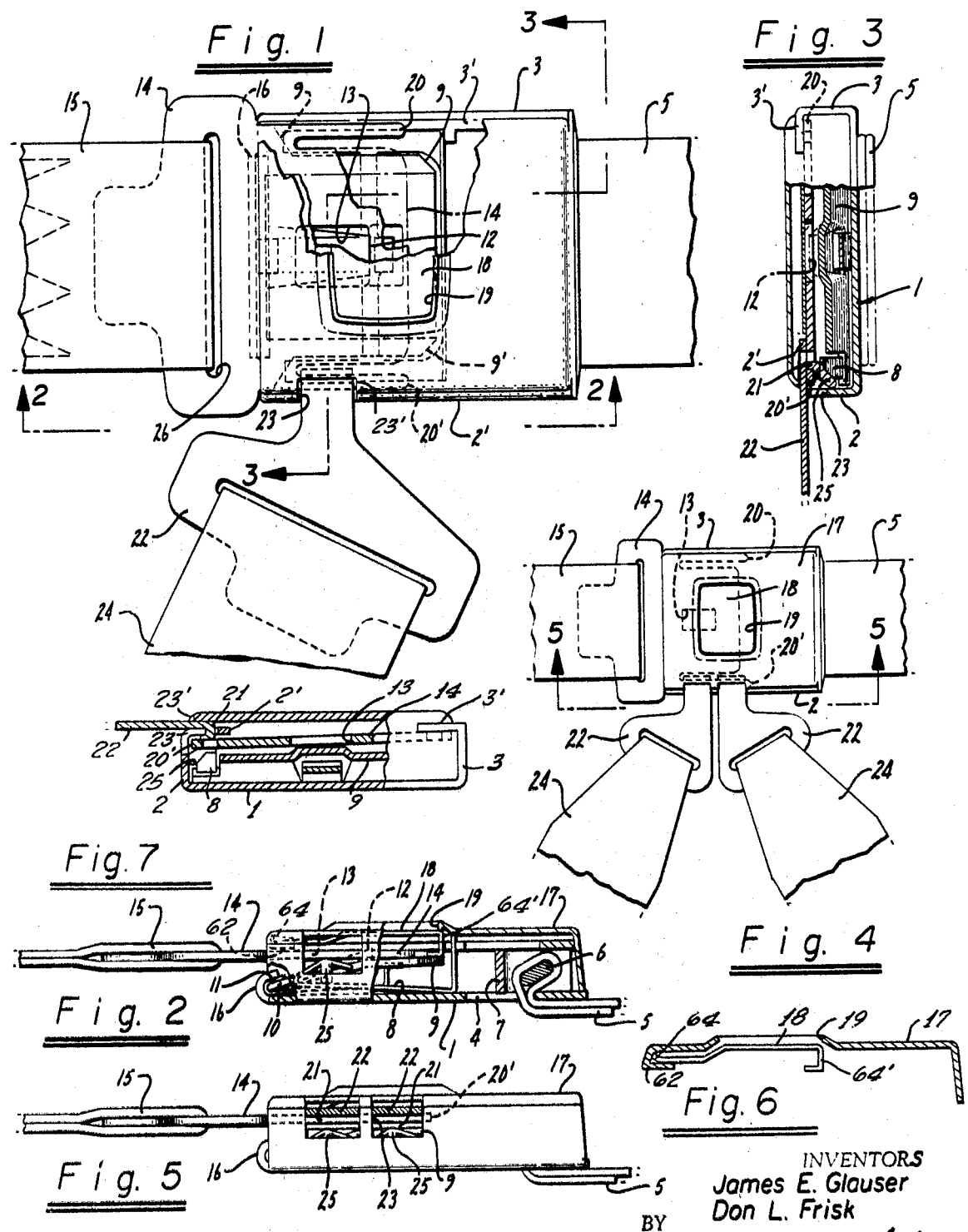
INVENTORS
James E. Glauser
Don L. Frisk
BY
Paul B. Hunter
Attorney

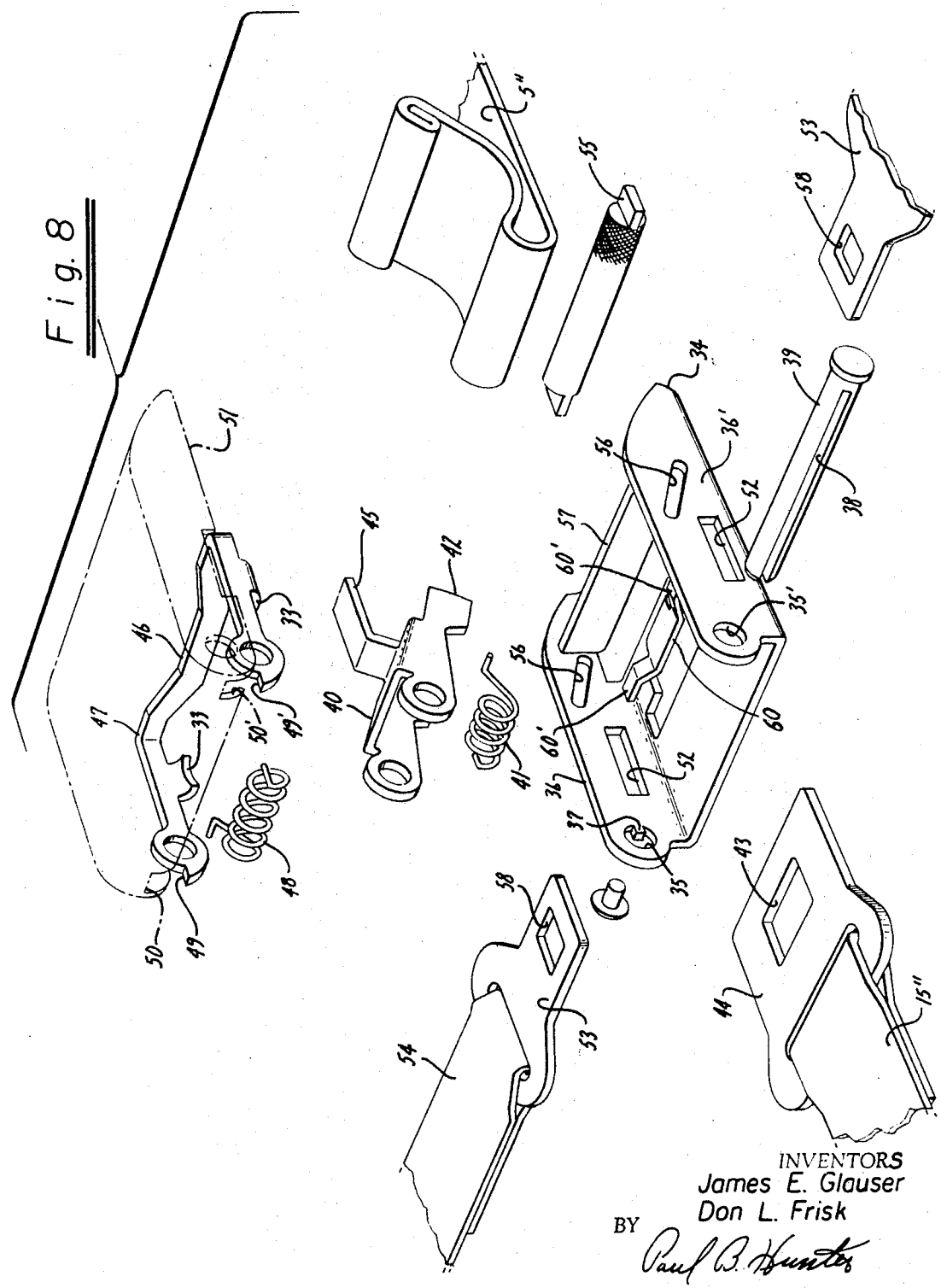

INVENTORS
James E. Glauser
Don L. Frisk
BY
Attorney

United States Patent Office 3,520,034
Patented July 14, 1970

3,520,034
SAFETY BELT BUCKLE
James E. Glauser, Santa Ana, and Don L. Frisk, Orange, Calif., assignors to Pacific Scientific Company, City of Commerce, Calif., a corporation of California
Filed Aug. 14, 1967, Ser. No. 660,335
Int. Cl. A44b *17/00, 19/00*
U.S. Cl. 24—205.19                           2 Claims

ABSTRACT OF THE DISCLOSURE

A safety belt having a buckle provided with latching means for initially interconnecting two seat belt sections and thereafter providing for connecting additional sections such as shoulder straps and crotch straps, the latching means automatically latching the sections when attached but permitting detachment of auxiliary sections without detaching the main seat belt sections.

---

This invention relates generally to buckles adapted for use in connection with safety belts employed on land and air vehicles such as automobiles and aircraft, and the invention has reference, more particularly, to a novel safety belt buckle that is adapted to receive additional straps such as shoulder or crotch straps as well as seat belt straps.

Safety belts have been used for many years in aircraft and in recent years in automobiles. These belts, which are usually of two piece woven material respectively attached at one of their ends to opposite sides of the seat, are commonly fastened together in front of the user by passing one end through or into a buckle clasp which is opened usually by turning a pivoted lever or cover. This opening movement disengages the clasp from the end of the webbing which can then be drawn out, releasing the user. It is important that these belt buckles be released easily after emergencies so as to free the user in case fire or other hazard. Also, it is highly desirable that these safety belt buckles be capable of connecting and disconnecting additional straps such as shoulder straps as well as seat belt straps as the latter alone will not prevent the user from striking his head againstt he windshield or other obstruction in use.

The principal object of the invention is to provide a novel safety belt buckle for interconnecting the ends of seat belt strap sections and for also connecting the end or ends of any additional strap or straps such as shoulder or crotch straps to the seat belt, said novel buckle being so constructed and arranged that as a safety measure the seat belt strap sections must be interconnected before said additional straps can be connected to said seat belt strap, thereby insuring the fastening of the seat belt whenever additional straps are attached thereto.

Another object of the present invention is to provide a novel safety belt buckle of the above character wherein a single means is employed for releasing all straps from the buckle, said means serving to initially release any additional attached straps and thereafter release the seat belt strap sections, so that once these sections are disconnected additional straps cannot be connected to the buckle.

Still another object of the present invention is to provide a novel safety belt buckle wherein the additional straps may be connected or disconnected without disconnecting the seat belt sections from the buckle.

A feature of the invention is to provide a buckle of the above character that may be used either right hand or left hand without any change of parts.

Figure 10:
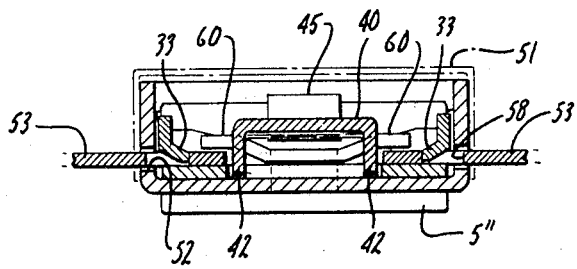
Figure 9:
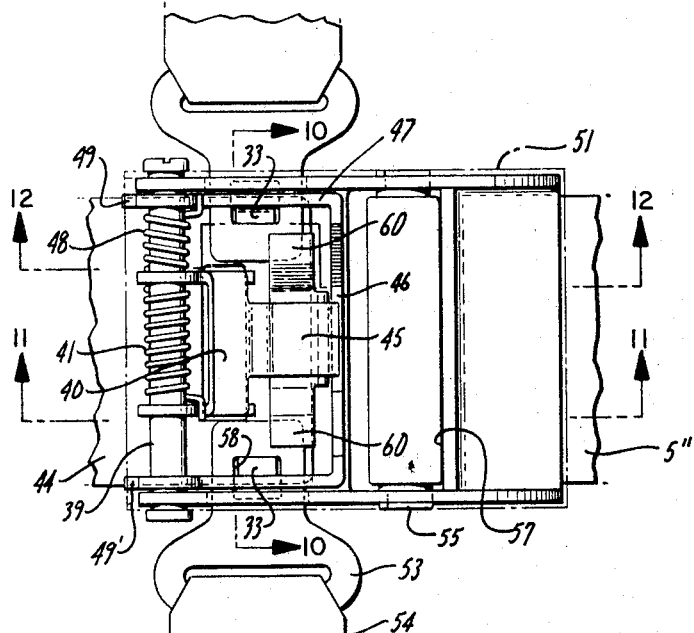
Figure 11:
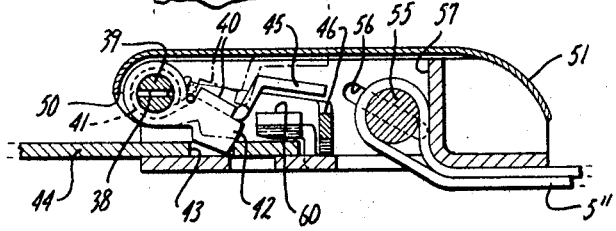
Figure 12:
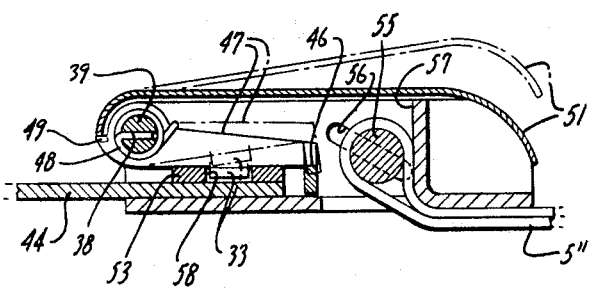

These and other features and advantages of the present invention will become more apparent after a perusal of the following specification taken in connection with the accompanying drawings wherein:

FIG. 1 is a plan view of one form of the novel belt buckle of this invention;
FIG. 2 is a view taken along line 2—2 in FIG. 1 with parts broken away, showing only the seat belt sections interconnected;
FIG. 3 is a view with parts broken away taken along line 3—3 of FIG. 1 and showing an additional strap connected to the buckle;
FIG. 4 is a view similar to FIG. 1 but showing two additional belts attached to one side of the buckle;
FIG. 5 is an enlarged view taken along line 5—5 of FIG. 4;
FIG. 6 is an enlarged fragmentary view showing details of construction;
FIG. 7 is an enlarged fragmentary view showing the manner of inserting and removing an auxiliary tongue;
FIG. 8 is an exploded perspective view of an additional form of the novel buckle of this invention;
FIG. 9 is a plan assembled view of the structure of FIG. 7 but with the buckle cover removed;
FIG. 10 is a sectional view taken along line 10—10 of FIG. 9;
FIG. 11 is a sectional view taken along line 11—11 of FIG 9; and
FIG. 12 is a sectional view taken along line 12—12 of FIG. 9.

Similar characters of reference are used in the above figures to designate corresponding parts.

Referring now to FIGS. 1 to 7 of the drawings, the reference numeral 1 designates the main frame of the buckle of substantially rectangular shape having side walls 2 and 3 provided with inwardly bent upper edge portions 2' and 3', the bottom of frame 1 having a transverse slot 4 for receiving the looped end portion of a seat belt strap section 5. This looped portion extends around a cross-bar 6 carried by a U-shaped frame 7 that is slidable within main frame 1 and serves by its sliding action to permit the length of seat belt section 5 to be adjusted, the bar 6 acting normally to bind the belt against the edge of slot 4 to hold the same in adjacent position in use. Within the main frame 1 there is contained a leaf spring structure 8 that presses upwardly against the under surface of a latch bar 9 that is pivoted at its lower outer end portion 10 (see FIG. 2) within a turned over transversely extending loop portion 11 or bight provided on the spring structure 8, said spring loop portion in turn being retained in a turned over lip 16 formed on main frame 1.

A metal tongue 14 has a transverse slot 26 for attachment to a complementary seat belt section 15. The free end portion of tongue 14 is narrowed for conformably entering the open end of main frame 1 and is provided with a slot 13 on its narrower portion. Latch bar 9 has an upwardly projecting lock dog 12 adapted for engaging in the slot 13 provided in the inserted portion of metal tongue 14. As tongue 14 enters the main frame, it depresses latch bar 9, the tongue riding over lock dog 12 by compressing spring structure 8 until, when the tongue 14 is fully inserted, the lock dog 12 snaps into slot 13, thus locking seat belt section 15 to the buckle.

A buckle cover 17 extends over the main frame 1, the latter and cover 17 having co-operating interlocking tongue and grooves for retaining the cover on the main frame. A pressure plate or button 18 underlies cover 17, is pivoted at its rear edge 64 in a turned under flange 62 of cover 17, and may be pressed by inserting one's finger through an aperture 19 in the cover 17. Pressure plate 18 has a depending flange 64' that engages the upper surface of latch bar 9, so that pressure applied to this plate will depress bar 9 against the pressure of spring structure 8, and, if depressed sufficiently, the tongue 14 will be released, thereby separating the seat belt sections.

The narrower insertable portion of tongue 14 is formed with two narrow side tongues or lock dogs 20 and 20' for interlocking with the hooked end or ends 21 (see FIG. 3) of one or more additional metal tongues 22 provided on one or more additional straps 24 such as shoulder or crotch straps, which hooked ends 21 are insertable through apertures 23 in the main frame and aligned notches 23' in the cover 17, thereby depressing a side tongue 20', for example, and hence tongue 14 which in turn depresses latch bar 9 somewhat as well as a beveled boss 25 provided on spring structure 8, thus also depressing this spring structure slightly, thereby retaining the hooked ends 21 in place and attaching the additional strap or straps 24 to the buckle as illustrated in FIGS. 3 and 7.

In use, with the seat belt sections interconnected by the buckle and an additional strap or straps connected thereto as shown in FIGS. 1 and 4, it is possible to easily and quickly disconnect the additional straps by depressing pressure plate 18 slightly to the position shown in FIG. 7 so as to relieve the pressure of beveled boss or bosses 25 on hooked end or ends 21. This limited movement of the pressure plate 18 and hence of latch bar 9 is not sufficient to disengage lock dog 12 from tongue 14 (see the dot-dash lines of 12 in FIG. 3) so the seat belt sections remain interconnected. Pressing the pressure plate 18 further inwardly will release the tongue 14 and enable the disconnection of the seat belt sections.

Thus, it will be seen that the additional straps 24 can only be latched inside the main frame after the primary tongue 14 on the seat strap section 15 is already engaged because the tongues 22 have to engage side tongues 20, 20' of primary tongue 14, though these additional straps can be disconnected without disconnecting the main seat strap sections, as is desired when one wishes to lean forwardly. Pushing all the way in on the pressure plate or button 18 will release all of the straps substantially simultaneously. The metal tongues 22 of the additional straps 24 can pivot or yield outwardly slightly in case of accident so as not to press unduly on the user's abdomen.

In the form of the invention shown in FIGS. 8 to 12 the main frame 34 is provided with aligned apertures 35, 35' in its side walls 36, 36'; aperture 35 having a lug 37 for engaging in a slot 38 in a pintle 39 extending through these apertures, whereby pintle 39 is prevented from turning. A latch bar 40 is pivoted on pintle 39 and is urged to turn clockwise as viewed in FIGS. 11 and 12 or downwardly as viewed in FIG. 9 by a coil torsion spring 41 that is wrapped around the pintle has one end bearing on the latch bar 40 and its other end engaged in slot 38. Latch bar 40 has a lock dog or dogs 42 provided thereon for engaging in a slot 43 provided in a tongue 44 attached to seat belt section 15". When tongue 44 is inserted into main frame 34 and slid under lock dog 42 against the tension of spring 41, the dog 42 locks tongue 44 within the buckle main frame.

Latch bar 40 is formed with a projection 45 for engaging in a saddle 46 provided in an auxiliary latch bar 47 that is also pivoted on pintle 39 and is also urged clockwise thereon as viewed in FIGS. 11 and 12 by a coil torsion spring 48 having one end engaging the latch bar 47 and its other end anchored in pintle slot 38. Auxiliary latch bar 47 is formed with locking lugs 33 for engaging and attaching additional straps to the buckle, as will further appear. Auxiliary latch bar 47 is formed with stop shoulders 49, 49' which engage in notches 50, 50' in the buckle cover 51 that is also pivoted on the pintle 39 exteriorly of the main frame 34. Thus, when the cover 51 is turned upwardly the notches 50, 50' pressing on shoulders 49, 49' will also turn auxiliary latch bar 47 upwardly against the tension of spring 48. The main frame side walls 36, 36' have apertures 52 for receiving the tongues 53 of additional auxiliary straps 54 such as shoulder and/or crotch straps, which tongues are adapted to engage the inner ends of lugs 33. The main frame 34 is provided with a stop member 60 that limits the inward movement of seat belt tongue 44 and has guide and stop projections 60' that serve to guide and limit the inward movement of the tongues 53 when they are inserted through apertures 52. Seat belt section 5" is passed around cross-bar 55 which by sliding along inclined slots 56 in the main frame 34 will lock strap 5" against end wall 57 provided on main frame 34 in desired adjusted position.

In use, the additional strap tongues 53 cannot be attached to the buckle when the seal belt section tongue 44 is unattached because these tongues 53 will pass under the locking lugs 33 without engaging the latter due to the absence of tongue 44, which, when present, elevates the tongues 53 so that they will strike and ride past the beveled lower portions of lugs 33. However, with seat belt section tongue 44 inserted in the buckle and locked by lock dogs 42, the strap tongues 53 upon insertion will thus ride over tongue 44 and under the lower beveled surfaces of locking lugs 33 raising these lugs and hence auxiliary latch bar 47 slightly until these lugs snap into slots 58 of tongues 53, thus securing the additional strap 54 or straps to the buckle. To release the additional strap or straps it is merely necessary to turn the buckle cover 51 outwardly somewhat, this cover acting through notches 50 and stop shoulder 49 to turn the auxiliary latch bar 47 upwardly against the tension of spring 48 as viewed in FIG. 12 so that locking lugs 33 clear the tongues 53, thus disconnecting the additional strap or straps. The seat belt strap tongue 44 remains locked by lock dog 42 however until cover 51 is turned outwardly further sufficiently to cause bight 46 of the auxiliary latch bar to engage projection 45 and force latch bar 40 upwardly against the tension of spring 41 as viewed in FIG. 11 into the dot-dash position, thus releasing lock dog 42 from slot 43 of tongue 44 and separating seat belt section 15" from the buckle.

Thus, it will be seen that in both forms of the novel buckle of this invention the seat belt must be fastened before additional straps can be attached to or detached from the buckle. Thus, even when a shoulder strap is detached as when leaning forward to perform some function on the vehicle, the seat belt remains fastened, which is in an important safety factor. However, all straps can be quickly released, when desired, by pushing the pressure plates 18, 18' all the way in, as in FIGS. 1 through 7, or turning cover 51 all the way out as in FIGS. 8 through 12. This prevents leaving any additional straps connected once at seat belt is disconnected. It will be noted that the locking parts of the buckle are mirror images of each other so that the buckle can be attached either right or left hand, as desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:
1. A safety belt buckle comprising a main frame having fastening means adjacent one end thereof for adjustably attaching one seat belt section thereto, said main frame providing an opening at its opposite end for receiving the apertured tongue of a complementary seat belt section, a main latch bar pivoted within said main frame, said latch bar having a locking dog, spring means engaging said latch bar for urging said locking dog inwardly towards its locked position, the insertion of the tongue of the complementary seat belt section serving to momentarily force said locking dog outwardly until the same snaps into the aperture of the tongue to lock the latter in the buckle, a buckle cover hinged on said main frame, an auxiliary latch bar pivoted within said main frame, and auxiliary spring means engaging said auxiliary latch bar to urge the latter inwardly towards its locked position, said auxiliary latch bar being connected to be turned outwardly by said cover, said main frame having an opening in the side thereof for receiving the apertured tongue of an auxiliary strap, said auxiliary latch bar having a locking lug thereon for engaging in the aperture of the auxiliary strap tongue under the action of its spring means when the latter tongue is inserted into the buckle frame side opening, provided the complementary seat belt tongue is locked in the buckle, said seat belt tongue when locked serving to force the auxiliary tongue outwardly against the tension of said auxiliary spring means during insertion of the auxiliary tongue into locking engagement with said auxiliary latch bar locking lug, the turning of said buckle cover partially outwardly serving to disconnect said auxiliary latch bar locking lug from the auxiliary latch bar locking tongue, releasing the latter while said seat belt section remains locked, whereby the auxiliary strap can be connected and disconnected at will without releasing the complementary seat belt section from the belt buckle, said main latch bar having a projection for engaging said auxiliary latch bar, the complementary seat belt tongue being released only upon further turning of the buckle cover outwardly to cause said auxiliary latch bar, acting through said projection, to disconnect said main latch bar locking dog from the complementary seat belt section tongue.

2. A safety belt buckle as defined in claim 1, comprising a hinge pintle fixedly carried by said main frame, said buckle cover and said main and auxiliary latch bars being turnably supported on said hinge pintle so as to have a common turning axis, said main latch bar spring means and said auxiliary latch bar spring means comprising torsion springs connected to said hinge pintle and to said respective latch bars, said main frame having stop projections for limiting the inward movement of said complementary seat belt section and auxiliary belt tongues.

References Cited

UNITED STATES PATENTS

| | | | |
|---|---|---|---|
| 2,469,391 | 5/1949 | Horning | 24—205.17 |
| 2,832,120 | 4/1958 | Jayet | 24—205.17 |
| 3,046,982 | 7/1962 | Davis | 24—205.17 X |

FOREIGN PATENTS

| | | |
|---|---|---|
| 728,533 | 7/1932 | France. |
| 678,171 | 7/1939 | Germany. |

BERNARD A. GELAK, Primary Examiner

U.S. Cl. X.R.

24—230; 297—389